May 14, 1957  J. T. COONS ET AL  2,791,853
ANIMATED DISPLAY
Filed May 11, 1954  3 Sheets-Sheet 1
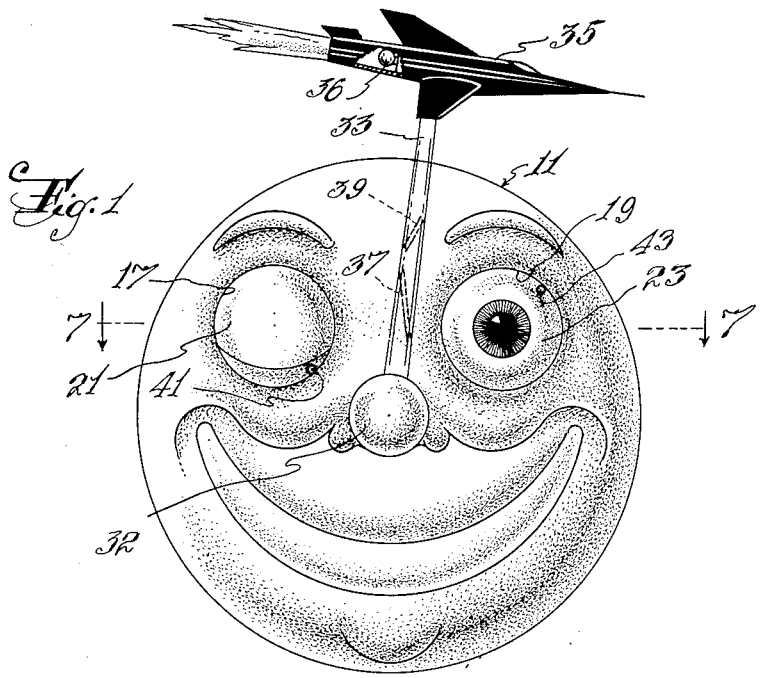
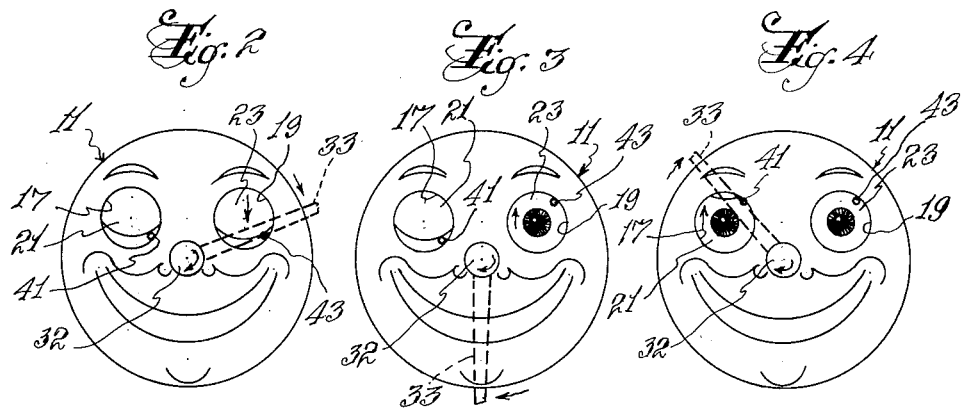
Inventors:
James T. Coons
& Ronald J. Coons
BY Ralph K. Bonell
Agent May 14, 1957 J. T. COONS ET AL 2,791,853
ANIMATED DISPLAY
Filed May 11, 1954 3 Sheets-Sheet 2
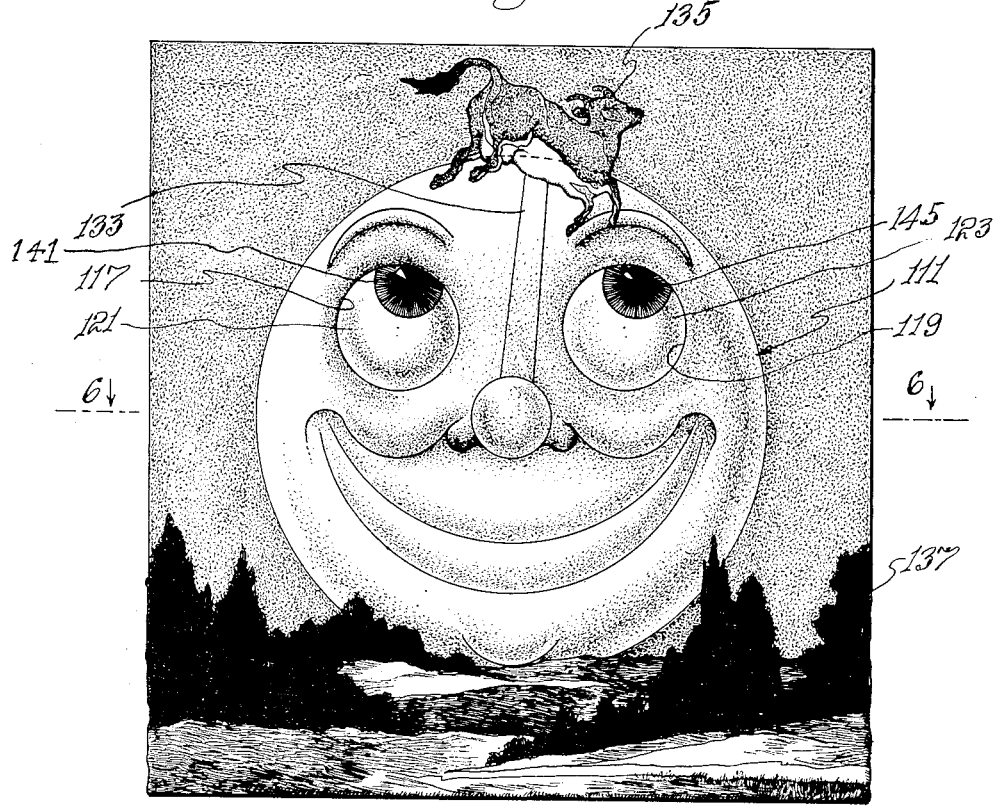
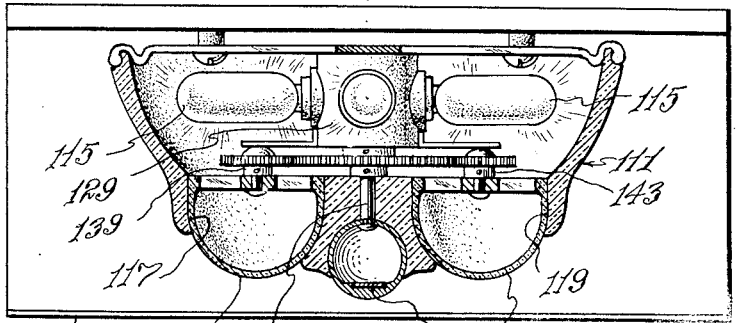
Inventors:
James T. Coons
Ronald J. Coons
BY Ralph K. Bonell
Agent

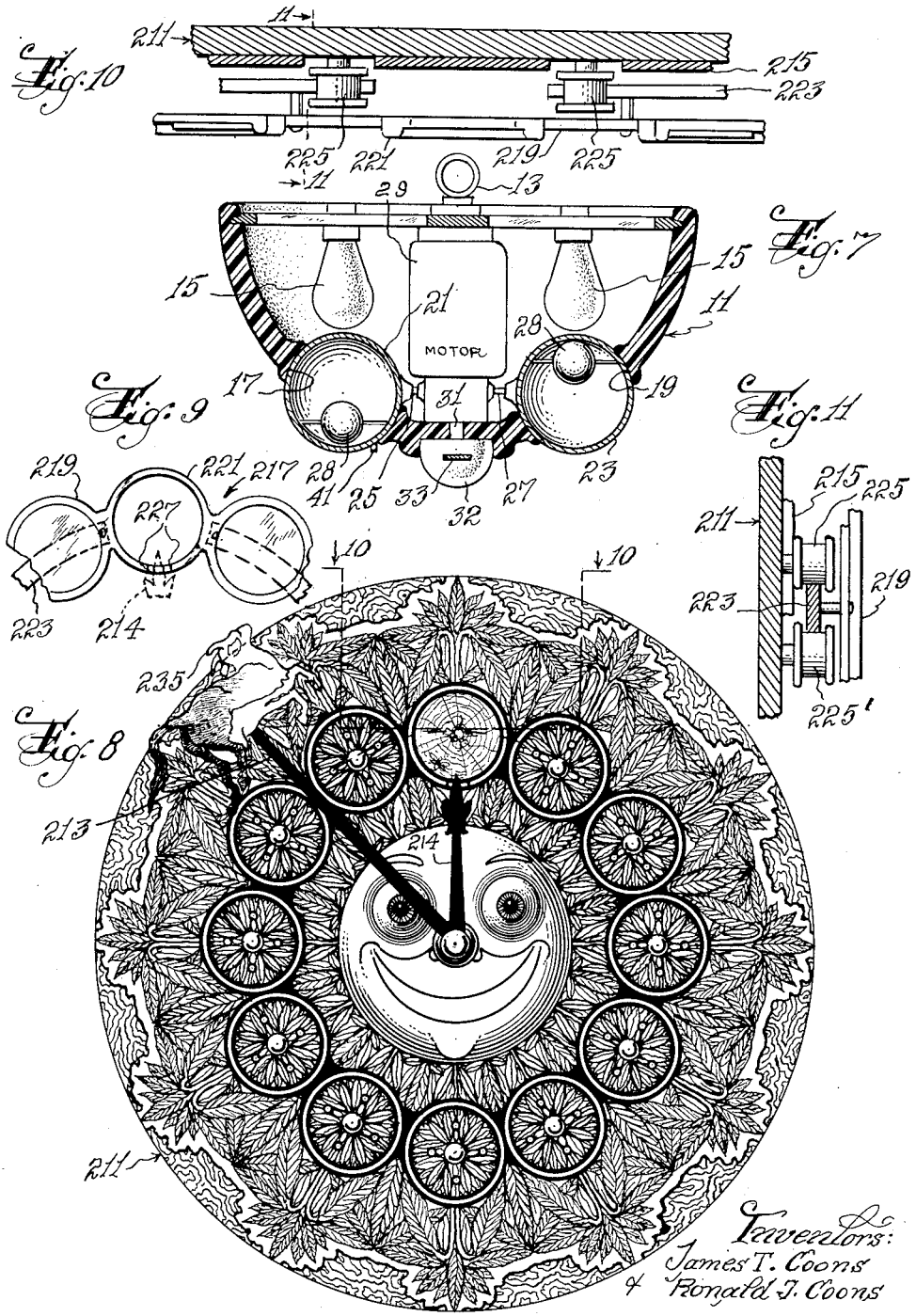

United States Patent Office 2,791,853
Patented May 14, 1957

2,791,853

ANIMATED DISPLAY

James T. Coons and Ronald J. Coons, Jersey City, N. J.

Application May 11, 1954, Serial No. 428,956

2 Claims. (Cl. 40—139)

This invention relates to displays for ornamental, educational, amusement and advertising purposes in which an animated effect is produced by causing continuous or intermittent movement of one or more members exhibiting a component design of the complete display.

As embodiments of the invention for purposes of illustration and description herein we have selected certain animated displays which are adapted to provide amusement and education for children through their association with nursery rhymes and with objects or events of current interest, although it will be apparent that the invention may take many other forms.

It is well known that motion tends to attract and hold attention, particularly the attention of a child, and we find that this is especially the case when the motion of an element or elements thereof is utilized to produce apparent animation of an object or scene and that in addition to providing amusement and stimulating interest, a story or events associated with such animated design is remembered more readily by a child than when illustrated by static designs alone.

It is, accordingly, an object of the invention to provide in a device exhibiting a unitary ornamental display, means for producing continuous and/or intermittent motion of certain elements thereof, to vary the aspect of the display as a whole.

It is another object to provide in a device exhibiting a unitary ornamental display, means for rotating a member exhibiting a portion of the display and means for continuously or intermittently varying the aspect of the visible area of a member exhibiting another portion of the display, to coordinate the aspect of the display as a whole with the phase of rotation of said first member.

It is a further object to enhance the appeal of an ornamental display of the foregoing character by providing novel features of illumination therefor.

Other objects and advantages of the invention will be apparent upon consideration of the following specification and of the drawings appended hereto in which:

Fig. 1 is a front elevation of an animated display constructed in accordance with the principles of the invention;

Figs. 2–4, incl., show various aspects of a portion of the display of Fig. 1, in accordance with the animation thereof;

Fig. 5 is a front elevation of a modification of the display of Fig. 1;

Fig. 6 is a section taken along the line 6—6 of Fig. 5;

Fig. 7 is a section taken along the line 7—7 of Fig. 1;

Fig. 8 is a front elevation of another modification of the display of Fig. 1;

Fig. 9 shows a portion of a ring assembly pertaining to the display of Fig. 8;

Fig. 10 is a section taken along the line 10—10 of Fig. 8; and

Fig. 11 is a section taken along the line 11—11 of Fig. 10.

It will be noted in the figures that the several ornamental displays depicted feature a moon and it will be recognized that those of Figs. 5 and 8, in particular, relate to the nursery rhyme which concludes with the line "And the cow jumped over the moon."

In Figs. 1 and 7 numeral 11 refers to a stationary base member exhibiting a major portion of the display. This member, in its illustrated form, appears as a bowl-like shell, preferably of translucent material such as plastic, which may be considered to simulate the appearance of the earth's moon and more particularly exhibits on the convex surface thereof the features of a human face, minus the eyes, which may be taken to be that of the "Man in the Moon." Member 11 may be provided with a hook or hooks 13 if designed to be suspended from a ceiling or with other suitable fastening devices if mounted on a wall. Lights 15 are mounted on and within member 11 for transmitting light therethrough, thus providing the effect of a luminous moon. Member 11 has apertures 17, 19 in the eye positions of the depicted face and spherical eye members 21, 23 are mounted on member 11 within said apertures, respectively, by pivots 25, 27, to fill the apertures. Each of eye members 21, 23 exhibits a design comprising two aspects of an eye, an open aspect and a closed aspect, and is rotatable about the pivotal axis thereof to either of two positions in which said aspects are respectively visible in the associated aperture in member 11. Each eye member is biased to one of said two positions (defined by a stop, not shown) due to being rendered pendulous about the pivotal axis thereof by an eccentrically mounted weight, as weight 28, or spring bias may be employed. In Figs. 1 and 7 the two eye members are biased to different positions.

A motor 29 (with reduction gearing, not shown) is mounted on and within base member 11 to drive shaft 31 extending through shell member 11 in the direction of the principal axis of symmetry of the shell and on the forward end thereof is mounted a member 32 exhibiting a portion of the design, in this case a nose. Shaft 31 also mounts arm 33, preferably of transparent material, which, in turn, mounts at the extremity thereof beyond member 11 an object 35 illuminated by lamp 36 supplied from the same source as lamps 15 by connecting means, not shown. Object 35, by virtue of its shape or ornamentation, is also a component of the complete display. In Fig. 1 object 35 may be taken to represent a rocket or space ship, which vehicles appear to be of interest in present-day juvenile circles.

Arm 33 is provided with a pair of cam members 37, 39, adapted to engage followers 41, 43, on eye members 21, 23, respectively, and contoured and positioned to displace said members, in turn, from the biased to the other of their respective operation positions during a selected period or phase of the rotation of arm 33, thereby causing a sequential change of aspect of the eyes in the display.

The complete display, as above described, comprises the component designs respectively exhibited by base member 11, nose member 32, eye members 21, 23 and rocket 35, in the animation of which the rocket repeatedly circumnavigates the moon, for example at the rate of once a minute, while the eyes of the "Man in the Moon" alternate between an open and a closed aspect to produce a winking effect, three phases of which are shown in Figs. 4–6 incl.

In the embodiment of the invention illustrated in Fig. 5, base member 111 simulates the moon in the manner of member 11 of Fig. 1 and is illuminated by lights 115. Eye openings 117, 119 and eye members 121, 123 are provided. Motor 129 (on the housing of which lights 115 are mounted) drives shaft 131 to rotate arm 133 which in this case terminally mounts object 135, designed as a cow, to present an animated display in which a cow seemingly jumps over the moon. To enhance the effect, screen 137, which exhibits a landscape design and whose top edge follows the apparent line between landscape and sky, is provided which obscures object 135 during a selected phase of the revolution of arm 133, the cow thus seeming to jump from the earth and return thereto after passing over the moon, without at any time appearing in an upside-down position. In this case, the eyes of the "Man in the Moon" instead of winking are caused apparently to follow the motion of object 135 by mounting each eye member on a rotatable shaft whose axis is eccentric to the circular representation of the eyeball. Thus, eye member 121 is mounted on shaft 139, eccentric to eyeball 141 which thereby serves as an index of the angular position of said member, while eye member 123 is similarly mounted on shaft 143. Shafts 139 and 143 are turned in the same direction, through gearing, from shaft 131. Because of their eccentric positions the eye designs exhibited by members 121, 123 "roll" and appear to follow the position of object 135.

In the embodiment of the invention shown in Figs. 8–11, incl., base member 211 serves as the face of a clock across which minute hand 213 and hour hand 214 sweep. The hour positions are defined by twelve different designs exhibited, respectively, by paper or like members of circular form, as member 215 (Fig. 10), mounted on base 211. These different designs, again, may be associated with a rhyme or story. A ring assembly 217 (Fig. 9) of light construction comprises a continuous member 219 of annular form having twelve circular panels, as panel 221, and a support 223 therefor, member 219 being spaced from said support (Fig. 10). Support 223 is in the form of a flat, interrupted, ring and is guided for rotation about the center thereof by suitably positioned pairs of grooved rollers, mounted on base 211, as rollers 225, 225' (Fig. 11).

In order that only one of the twelve hour designs exhibited on base 211 may be visible at a time, member 219 has eleven opaque panels (preferably blank, or exhibiting a uniform design, as illustrated) and one panel 221 with a circular aperture bounded by a narrow rim. Member 219 is mounted concentric with the hour design circle on base 211 and each opaque panel thereof is adapted, when in suitable position, to obscure one of the hour designs, while the aperture in panel 221, when in suitable position, permits one of the hour designs to be visible, the interruption in ring 223 occurring at panel 221 to permit a clear view of the design therebeneath. In order that the visible design shall be associated with the position of hour hand 214, a pair of spaced lugs 227 is provided on the rim of panel 221 which are intermediately engaged by hand 214. Ring assembly 217 thus is propelled in a circular orbit by the hour hand and the hour design to which said hand points at any instant is visible in the aperture in panel 221.

As described above, a continuous motion is given to ring assembly 217 which may be preferred in certain forms of the invention in order that adjacent hour designs may "fade in" and "fade out" of the display as a whole. If an intermittent motion of the hour hand and ring assembly is desired, whereby a single and complete hour design is visible for a period of substantially one hour, this may be accomplished by incorporating an intermittent motion in the hour hand drive such motions (Geneva motions, and the like) and their applications being well known in the mechanical arts.

Conventional motive means may be provided to drive minute hand 213 and hour hand 214, the latter hand being allotted the function of arms 11 and 111 of Figs. 1 and 5, respectively, in that an object exhibiting a portion of the display is mounted thereby for rotation therewith, said object in the present case being designed as a cow, as in Fig. 5, while base 211 centrally exhibits the "Man in the Moon."

It is to be understood that the embodiments of the invention shown and described herein are by way of illustration, only, the limits of the invention being defined in the appended claims.

We claim:

1. An illuminated animated display simulating a face having alternately winking eyes comprising in combination a translucent bowl-shaped shell exhibiting on the convex surface thereof the features of a human face minus the eyes and having apertures of circular form in the eye positions thereof, a light source mounted on said shell within the cavity thereof for illuminating the shell by transmitted light, a pair of spherical eye members respectively filling said apertures each exhibiting on different portions of the surface thereof an open aspect and a closed aspect of an eye, means pivotally mounting said members on said shell for individual rotation thereof between two positions in which said two aspects are respectively visible within the boundaries of the aperture associated with the rotated member, means individually biasing said members toward one of said two positions, opposite eye aspects being respectively visible within the boundaries of said apertures when said members are in their biased positions, a motor mounted on said shell within the cavity thereof having a shaft extending along the principal axis of symmetry of the shell, an arm mounted on said shaft for rotation in proximity to said eye members, cam means mounted on said arm, and individual follower means mounted on said eye members for cooperation therewith, said follower means being engaged in sequence by said cam means during rotation of said arm to displace the eye members each about the pivotal axis thereof from the biased to the other of said two positions.

2. Display means as claimed in claim 1 wherein said arm extends beyond the boundaries of said shell and a hollow translucent member bearing a design supplementing the design formed by said shell and eye members is mounted thereon for revolution about said shell externally thereof, together with a light source mounted within said last member for illumination thereof by transmitted light.

References Cited in the file of this patent

UNITED STATES PATENTS

| 1,284,116 | Lee | Nov. 5, 1918 |
| 2,536,237 | Thompson | Jan. 2, 1951 |

FOREIGN PATENTS

| 651,829 | France | Oct. 29, 1923 |